United States Patent [19]

Folschweiler

[11] 4,330,247
[45] May 18, 1982

[54] APPARATUS FOR FORMING MOULDED ARTICLES FROM A BLANK SHEET

[76] Inventor: Serge L. Folschweiler, 5 Nelson St., Batawa, Ontario, Canada, K0K 1E0

[21] Appl. No.: 157,378

[22] Filed: Jun. 9, 1980

[30] Foreign Application Priority Data

Jun. 12, 1979 [CA] Canada .................................. 329544

[51] Int. Cl.³ ...................... B29C 17/04; B29C 17/06
[52] U.S. Cl. ................................ 425/174.8 E; 264/26;
264/510; 264/554; 264/314; 264/316; 425/193;
425/195; 425/340; 425/342.1; 425/388;
425/389; 425/DIG. 19
[58] Field of Search ................. 425/174.8 R, 174.8 E,
425/195, 340, 342.1, 389, 388, DIG. 19, DIG.
44, DIG. 124, 193, 174.4; 264/25, 510, 554, 314,
316, DIG. 50, DIG. 78, 26; 156/224, 382

[56] References Cited

U.S. PATENT DOCUMENTS 2,458,864  1/1949  Lindsay .............................. 156/224

3,559,236  2/1971  Merritt ........................... 425/195 X

FOREIGN PATENT DOCUMENTS 851835  1/1940  France ................................ 264/314

Primary Examiner—Jan H. Silbaugh
Attorney, Agent, or Firm—Holman & Stern

[57] ABSTRACT

The invention provides an apparatus for forming moulded articles such as removable insoles for shoes. A blank is placed between a rigid plate corresponding to the peripheral base contour of the finished article on one side thereof and a mould bed corresponding to the shape of the article on the other side thereof. Peripheral areas of the blank are exposed by the plate and a flexible diaphragm is applied over the plate under pressure or with the aid of a vacuum after heating the blank to the softening point, to define said peripheral base contour, and to conform the other side and the exposed areas of the blank to the shape of the mould bed. In the case of shoe insoles, a range of sizes can be made with the same mould bed, using only different sizes of plate.

9 Claims, 3 Drawing Figures

APPARATUS FOR FORMING MOULDED ARTICLES FROM A BLANK SHEET

BACKGROUND OF THE INVENTION

This invention relates to apparatus for forming moulded articles from a blank sheet, particularly removable insoles for shoes.

Insoles are generally sold at shoe stores which may be inserted into an ordinary pair of shoes by the wearer. Such insoles serve to make an older pair of shoes, in which the fitted insole is becoming excessively worn, more comfortable for the wearer. They are also useful generally to make shoes more comfortable and, if necessary, provide some extra padding in the case of shoes which are slightly too large for the wearer. Additionally, for athletic shoes, it may be desirable to have some means for providing extra padding and absorbing perspiration.

Recently, such insoles have been made from thermoplastic material in a conventional two part male and female mould. A suitable thermoplastic material for this purpose is available on the market complete with a fabric lining on one side for contact with the foot. In order to make the insole, a mould is used which comprises two male mould beds and corresponding female mould parts co-operating therewith. A blank sheet is inserted between male and female parts of the mould and, after softening the sheet, these two parts are brought together so that the sheet takes on the shape of the mould in a conventional manner. The insoles then have to be cut out from the moulded blank in a further operation and, not only is this time consuming, it leads to a considerable amount of waste in that the material of the blank between the adjacent insoles formed in the double mould has to be discarded. As the thermoplastic material used for making insoles is extremely expensive, this constitutes a considerable disadvantage. Furthermore, the operation of cutting out the formed insoles from the blank is time consuming and expensive in itself. It was previously necessary to use either a double mould, or at the very least, have part of the blank protruding from the side of the mould because the thermoplastic material is quite slippery when in the softened state and, if only just enough material to form the blank was used, it was found extremely difficult to correctly locate the blank within the mould. Thus, with a conventional male and female two part mould, it is always necessary to effect a final cutting operation to trim off excess material after the moulding operation.

A further disadvantage with the conventional male and female mould is that different mould parts have to be used for each size of insole. There had to be as many mould sizes as there are shoe sizes. Since the mould parts are accurately machined and expensive in themselves, this contributed significantly to the final cost of the formed insole.

BRIEF DESCRIPTION OF THE INVENTION

An object of the present invention, therefore, is to reduce the number of different mould parts required for the full range of insole sizes and also to reduce the wastage of material which occurs in a conventional double two part mould.

The invention provides an apparatus for forming a moulded article from a blank comprising a plate corresponding to the peripheral base contour of the finished article on one side thereof, a male mould bed corresponding to the shape of the article on the other side thereof, said plate being adapted to be placed on said male mould bed with said blank therebetween, a flexible diaphragm extending over said mould bed, and means for applying said flexible diaphragm against said plate and said mould bed with said blank therebetween so as to follow the contours of said plate and said mould bed.

The male mould contour is preferably a foot bed contour shaped such that the finished article may be inserted into a shoe as an insole where it comfortably fits around the foot of the wearer. The blank sheet is preferably of a thermoplastic material having a fabric lining on the other side, that is the side which is to contact the foot the wearer.

Since the factor which mainly determines whether a given insole will fit into a given shoe is its base contour, owing to the inherent flexibility of the sidewalls of the insole, the same male mould bed can be used with different plates to make insoles covering a range of different sizes. Indeed, it has been found that only three mould beds are required to cover the normal range of shoe sizes, if a different plate is used for each size. This is much simpler than using a different male and female mould part which was necessary in the prior art method of making insoles.

DESCRIPTION OF DRAWINGS

The invention will now be described in more detail, by way of example only, with reference to the accompanying drawings in which.

DETAILED DESCRIPTION OF PREFERRED EMBODIMENTS

Figure 1:
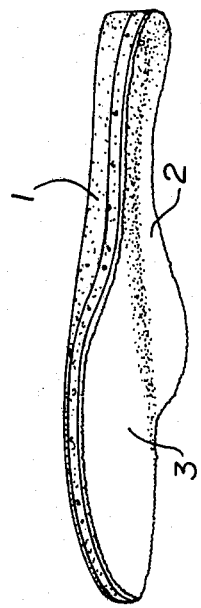
FIG. 1 is an underneath perspective view of an insole adapted to be inserted into a shoe.

As shown in FIG. 1, the insole for insertion into a shoe comprises a base 1 having a contour which exactly matches the shape of the shoe into which the insole is to be fitted. The insole has a generally upstanding sidewall 2 extending around its periphery at the instep and heel regions of the foot. The underside of the insole as shown in FIG. 1, which is the side in contact with the foot when in a shoe, generally conforms to the shape of a foot so as to provide maximum comfort for the wearer in use. The insole is made of a cellular thermoplastic material which is lined on its underside 3 with a knitted fabric lining for added comfort. Owing to the inherent flexibility of the material, the factor which mainly determines whether the insole will fit into a shoe of given size is the contour of the base 1. Provided this fits into the shoe, the walls 2 will flex sufficiently to conform to its shape.

Figure 3:
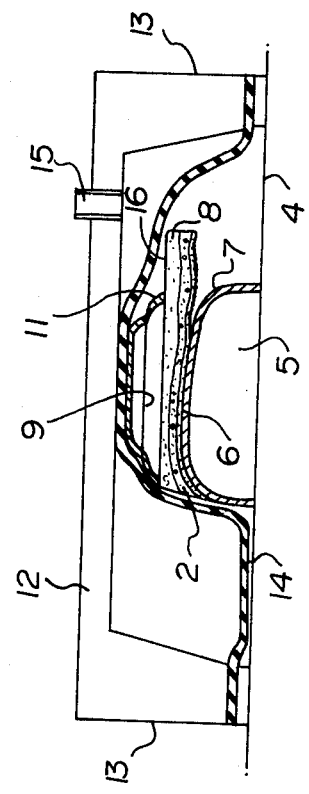
FIG. 3 is a cross-sectional view of a moulding apparatus in accordance with the invention.
Figure 2:
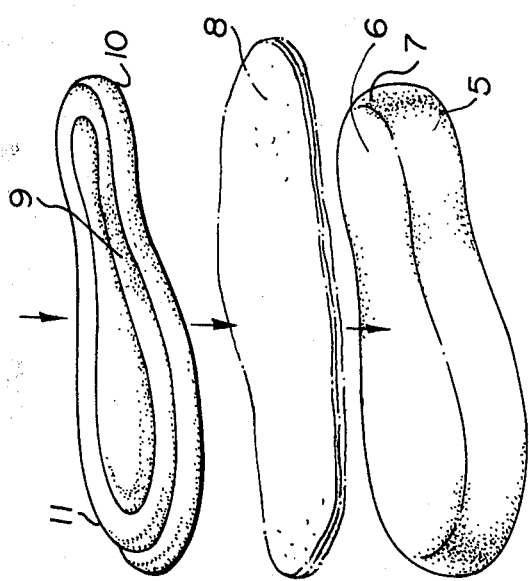
FIG. 2 is an exploded view showing the arrangement of the mould plate, bed and blank.

As shown in FIG. 3, the apparatus for forming the insole comprises a flat surface 4 on which is placed a male mould or foot bed 5. The foot fed 5 corresponds substantially to the male part of the mould used in conventional moulds and has its upper surface 6 and its upper peripheral edges 7 shaped in such a manner that they are complementary to the under surface 3 of the finished insole. The surface 6 and edges 7 are therefore shaped to define the shape of the under surface 3 of the insole which, when in the shoe, will be the side which accommodates the wearer's foot.

A blank 8 is cut from a sheet of cellular thermoplastics material having its fabric lining already provided thereon. The shape of the blank corresponds to the developed or opened up form of the insole shown in FIG. 1. Only as much material as will be required to form the finished insole is used in the blank. The blank 8 is placed on the upper surface 6 of the foot bed 5. A rigid and flat bottomed plate 9, which has a peripheral contour 10 corresponding to the contour of the peripheral contour of the base 1 of the insole, is placed on the blank 8. The plate 9 is preferably of aluminum and it is provided with rounded upper edges 11.

A bell-shaped housing 12 having depending side walls 13 is placed on the surface 4 so as to cover the foot bed 5 with the blank 8 and metal plate 9 thereon. A flexible diaphragm 14, which is preferably made of rubber, extends across the mouth of the bell-shaped housing 12 and over the metal plate 9 and foot bed 5. Immediately prior to use, the housing 12 is locked to the surface 4 by means not shown. The upper wall of the housing acts through the flexible diaphragm 14 on the metal plate 9 to hold it firmly in place on the foot bed contour 5.

In operation, the apparatus is set up as described and the blank 8 is heated by some suitable means. The blank may be heated prior to insertion into the apparatus or, alternatively, it may be heated in situ by means of high frequency radiation. By selecting the frequency of the radiation to lie in the absorption band of the thermoplastic material forming the blank, satisfactory heating can be obtained. In this latter event, a source of high frequency radiation is placed adjacent the mould.

Compressed air is then injection through line 15 into the housing 12 causing the diaphragm 14 to act on the plate 9, the blank 8, and the foot bed contour 5. The left hand side of FIG. 3 shows the diaphragm conforming to the plate and foot bed arrangement under pressure and the right side of FIG. 3 shows the position of the diaphragm prior to the application of the compressed air. Of course, instead of applying compressed air above the diaphragm, a vacuum could equally well be formed underneath the diaphragm so as to draw the diaphragm around the foot bed and metal plate.

As shown in FIG. 3, when the blank 8 is placed between the plate 9 and the foot bed 5, a peripheral area of the blank 8, which is to form the side walls of the insoles, is left exposed. When pressure is applied to the diaphragm, the portion of the blank 8 which is immediately beneath the metal plate 9 conforms to the shape of the upper surface 6 and peripheral edges 7 of the foot bed 5. The exposed areas 16 are also forced around the peripheral edges 7 of the foot bed 5 and define the side walls 2 of the finished insoles.

If it is desired to make an insole to fit, for example, a smaller shoe than that for which the insole shown in FIG. 1 is intended, it is merely necessary to replace the plate 9 by a slightly smaller plate. This produces an insole having a smaller base 1 which matches the shape of the smaller shoe into which the insole is to be inserted. As the same foot bed 5 is used, the shape of the side walls 2 will be determined by the shape of the peripheral edges 7 outside the periphery of the plate 9. This means that as the size of the plate 9 is varied, the curvature of the side walls varies owing to the different portions of the peripheral edges 7 to which the exposed areas of the blank are subjected. This is however of little consequence because the main factor which determines whether an insole will fit into a shoe of a given size is the peripheral contour of the base 1. If the curvature of the side walls does not exactly match the curvature of the shoes, this is of no consequence because the inherent flexibility of the thermoplastic material will allow the side walls to bend into the required shape. This means that, for a given foot bed 5, a range of sizes of insoles can be made simply by using different sized plates 9. In fact, it has been found that the whole range of standard shoe sizes can be covered by using a range of different sizes for the metal plate 9 with only three different sizes of foot bed 5.

Furthermore, in the described apparatus, the blank can be cut to shape before insertion into the apparatus since it is held firmly against the foot bed 5 by means of the diaphragm and housing 12. Not only does this eliminate the time consuming cutting operation, which previously took place after moulding, but it also substantially reduces the wastage of material. Of course, if desired, a series of foot beds 5 can be arranged side by side in a single housing so as to mould a plurality of insoles at the same time.

I claim:

1. Apparatus for forming a removable shoe insole from a blank, said insole having a substantially flat base portion on its underside adapted to fit into a shoe, generally upstanding sidewalls and an upper side adapted to receive the foot of the wearer, said apparatus comprising a male mould bed having an upper surface corresponding to the shape of the insole on the upper side thereof, a plurality of rigid plates which are generally flat on a lower surface thereof, each said rigid plate being adapted to be placed on said male mould bed with a said blank between said mould bed and said plate, and said lower surface of each said rigid plate having a periphery of a different size corresponding to the underside of the base portion of a predetermined size of insole, a flexible diaphragm extending over said mould bed, and means for applying said flexible diaphragm against one said rigid plate and said mould bed with said blank therebetween whereby the upper side of the insole and said sidewalls are conformed to the shape of said mould bed and the shape of the underside of said base portion is determined by the shape of said one rigid plate.

2. An apparatus as claimed in claim 1, further comprising a bell-shaped housing adapted to be fitted over said plate and mould bed to define an air-tight enclosure.

3. An apparatus as claimed in claim 2, wherein said bell-shaped housing has an upper wall which is adapted to apply sufficient force on said plate through said flexible diaphragm to retain the plate in position.

4. An apparatus as claimed in claim 2, wherein said bell-shaped housing is provided with an inlet for receiving compressed gas to apply said flexible diaphragm against said plate and said mould bed.

5. An apparatus as claimed in claim 1, comprising means for creating a vacuum on the underside of said diaphragm to apply said diaphragm against said plate and said mould bed.

6. An apparatus as claimed in claim 1, comprising a source of high frequency radiation for heating the blank when in position between the rigid plate and the mould bed.

7. An apparatus as claimed in claim 1 and further comprising a plurality of said mould beds are provided each with an associated said respective plate arranged beneath a common flexible diaphragm for producing a plurality of said moulded articles simultaneously.

8. An apparatus as claimed in claim 1, wherein said flexible diaphragm is made of rubber.

9. An apparatus as claimed in claim 1, wherein the edges on the upper surfaces of each said plate are rounded.

* * * * *